May 30, 1950 D. L. O'DEA 2,509,780

MAGNETIC RECORD REPRODUCING SYSTEM

Filed April 29, 1948

DOROTHY L. O'DEA
INVENTOR.

BY [signature]

ATTORNEY

Patented May 30, 1950 2,509,780

UNITED STATES PATENT OFFICE 2,509,780

MAGNETIC RECORD REPRODUCING SYSTEM

Dorothy L. O'Dea, Los Angeles, Calif., assignor to Radio Corporation of America, a corporation of Delaware Application April 29, 1948, Serial No. 23,898

6 Claims. (Cl. 179—100.2)

This invention relates to sound reproducing systems, and relates particularly to a reproducing system for magnetic sound records.

In the art of sound recording and reproduction, many types of sound record carriers, sound tracks, and reproducing systems therefor, have been used, the present invention being directed to a reproducing system for the magnetic type of sound record either on tape or film. The tape or film may or may not have perforations or sprocket holes, the record or track may be of various widths, and there may be a plurality of parallel records longitudinally disposed on each strip. The magnetic particles of the tape may be magnetized in various directions, the usual form of magnetization creating alternate north and south poles longitudinally, or in the direction of advancement of the tape.

The reproducing system described hereinafter utilizes the usual form of magnetized record to attract and repel the end of a magnet bar attached to an electrode of an electronic tube to vary the impedance of the tube. The reproducing circuit may be of the standard type using a single tube, or may be of the push-pull type either with a push-pull form of record or with a standard form of record. Since the magnetization in the tape or film is small, the use of a vibratron or electronic transducer type of pickup is suitable, since considerable amplification is obtainable by the use of such a tube.

The principal object of the invention, therefore, is to facilitate the detection and reproduction of magnetic sound records.

Another object of the invention is to provide an improved detection method and system for magnetic sound records.

A further object of the invention is to provide an electronic transducer detector for magnetic sound records either of the standard type or of the push-pull type.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

Figure 1:
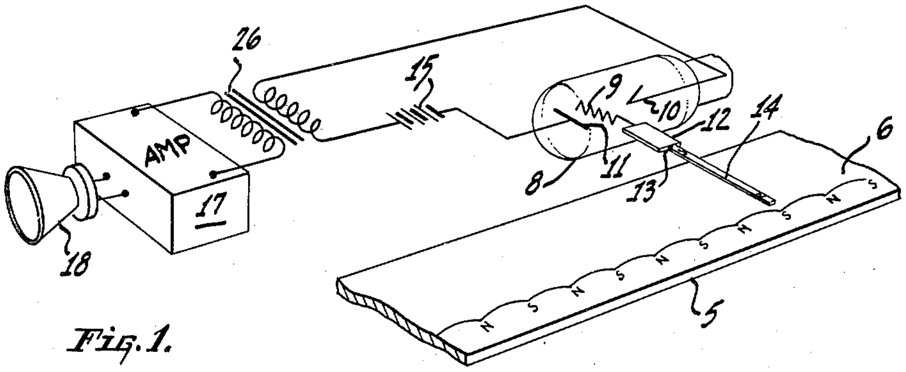
Fig. 1 is a diagrammatic, perspective view of a standard magnetic record detecting system embodying the invention.

Referring now to the drawings, a magnetic film or tape 5 has thereon a longitudinally magnetized record 6 as indicated by the alternate south and north poles. There is diagrammatically represented at 8, a triode type electronic transducer in which a voltage is developed by the motion of a grid 9 within the tube and positioned between a cathode 10 and an anode 11, such transducers having been developed and already used as pickup elements for phonograph records. Movement of the grid is obtained by movement of a bar 12 extending through a metal side of the transducer, to which is attached, by an insulator 13, a magnetized bar 14 having a north pole at the end farthest from the transducer and a south pole at the insulator 13. The north pole end of the bar is closely spaced adjacent the carrier 5. The output circuit of the tube 8 is between the anode and cathode in which is connected a direct current voltage supply 15 and the primary of a transformer 16. The secondary of the transformer is connected to an amplifier 17 feeding a loudspeaker 18. Although a triode type of transducer is shown, a diode type is also usable. The bar 14 may be spaced farther from the carrier with a north pole extension at right angles to the bar, the extension terminating in a short bar spanning the width of the record. The bar 14 may also be reversely magnetized.

Reproduction in such a system is obtained by advancing the magnetic record carrier 5 by any suitable means not shown, so that, as mentioned above, the north end of the bar is closely adjacent the sound record 6. Therefore, in accordance with the strength of the magnetization in the record, the end of the bar 13 will be attracted to or repelled from the record, thus causing movement of the grid 9, thereby causing voltage fluctuations in the primary of transformer 16, which will be translated into sound waves by the speaker 18.

Figures 2, 3:
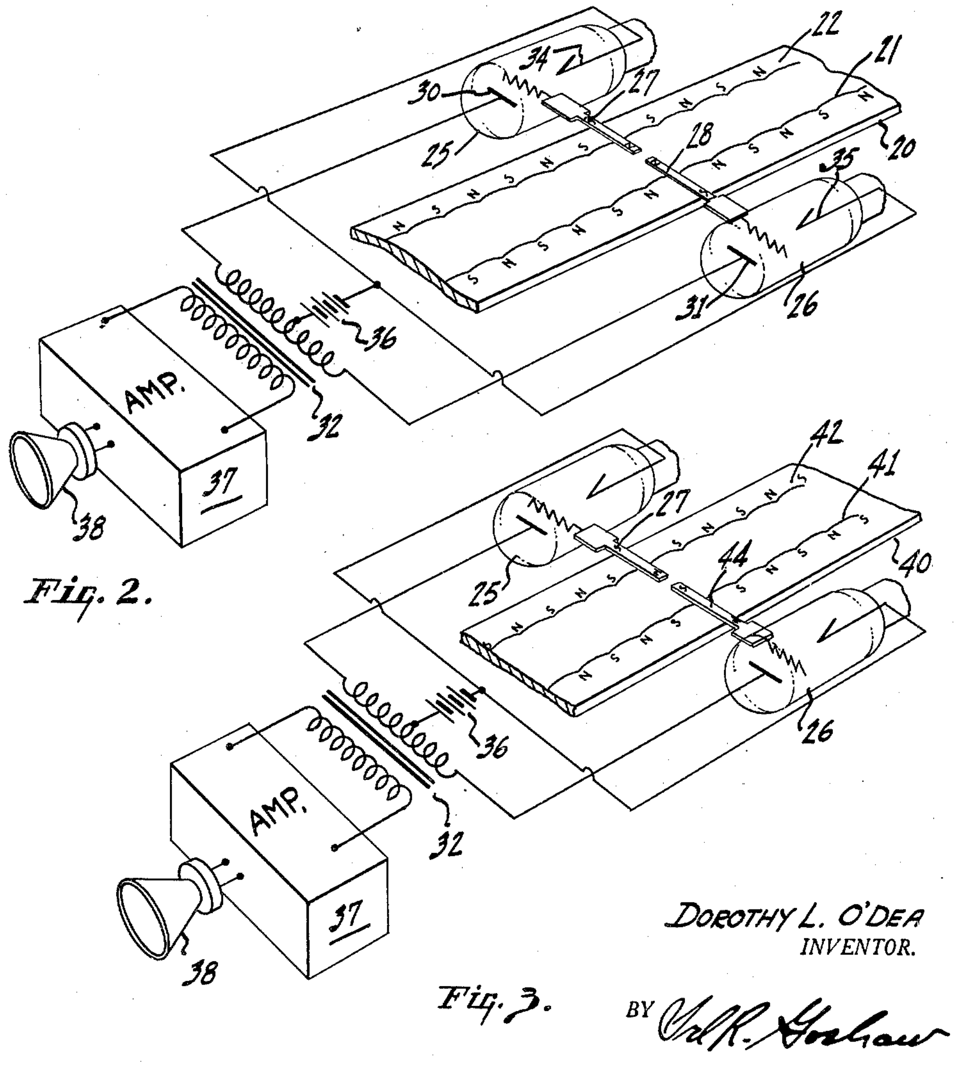
Fig. 2 is a diagrammatic, perspective view of a push-pull magnetic record detecting system embodying the invention.
Fig. 3 is a diagrammatic, perspective view of a push-pull reproducing system utilizing a standard form of magnetic record.

Referring now to Fig. 2, a record carrier 20, which may be tape or film, contains a sound record made up of two sections 21 and 22, these sections having opposite polarities transversely of the record. That is, the record has been recorded as a push-pull record. To reproduce such a record, two triode type electronic transducers 25 and 26 are utilized, the ends of bars 27 and 28, respectively, extending over the respective sections. The anodes 30 and 31 are connected to the ends of the secondary of a transformer 32, while the cathodes 34 and 35 are connected together and through a direct current voltage supply 36 to the center tap of the secondary of transformer 32. The secondary of the transformer is connected to an amplifier 37 feeding a loudspeaker 38. The above circuit, therefore, will reproduce the record 21—22, since, when the north end of bar 27 is attracted to the section 22 by a south pole of the section 22, the north end of bar 28 will be repelled by a north pole of the section 21, this north pole lying opposite the south pole transversely of the carrier 20 and having equal magnetization. There is thus provided a push-pull record and a push-pull reproducing circuit therefor. Although the ends of bars 27 and 28 adjacent the record sections are shown magnetized as north poles, they both may be south poles.

In Fig. 3, a carrier 40 contains either two sections 41 and 42 of a record recorded in the standard manner, and thus, with the same polarities transversely of the carrier 40, or a standard type of record such as shown at 6 in Fig. 1, except that it is recorded over a wider transverse width of the carrier 40. Such a recording may be reproduced by the same system as shown in Fig. 2, except that transducer 26 has a bar 44 which has its end farthest from the transducer magnetized as a south pole. Therefore, this standard type of record may be reproduced in push-pull, since, when the end of bar 27 is repelled away from the record by an adjacent north pole of the record, the end of bar 44 will be attracted to the record by the same north pole. In this instance also, the bars 27 and 44 may be reversely polarized.

Since very small movements of the grids in the transducers are capable of producing considerable amplification, the control bars may have appreciable length so that small magnetic fields will actuate the control bars. Because of the advantages of a push-pull system of reproduction in eliminating various forms of distortion, either a standard form of record or a push-pull form of record may be reproduced in push-pull by the same circuit system such as shown in Figs. 2 and 3.

I claim:

1. A magnetic record reproducing system comprising a magnetic record carrier having a magnetic record thereon with alternate north and south poles longitudinally of said carrier and an electronic transducer having a cathode and a movable control element therein extending from said transducer to a position adjacent said record, and an amplifier connected to the output of said transducer, variations in magnetism of said record causing corresponding movements of said control element toward and away from said record carrier, thereby varying the voltage impressed on said amplifier.

2. A magnetic record reproducing system in accordance with claim 1, in which said magnetic record is a push-pull record having sections with opposite polarities transversely of said record, and a second transducer is provided, said first transducer detecting one of said sections and said second transducer detecting said other section.

3. A magnetic record reproducing system comprising a magnetic record carrier having a magnetic record thereon having alternate north and south poles longitudinally of said record, a pair of electronic transducers, a control bar extending from each of said transducers for varying the position of an electrode therein, the ends of said bars being magnetized and positioned adjacent said record and movable toward and away from said record in accordance with the intensity of the magnetism in said record, and a push-pull electrical circuit connected to said transducers.

4. A magnetic record reproducing system in accordance with claim 3, in which said record is a push-pull record having two longitudinal sections with opposite magnetizations transversely of said carrier, and the ends of said bars have the same magnetization.

5. A magnetic record reproducing system comprising a magnetic record carrier having a magnetic record thereon with alternate north and south poles longitudinally of said record, a triode type electronic transducer having a fixed anode, a fixed cathode, and a movable grid, a mounting for said grid extending externally of said transducer, the external portion of said mounting being magnetized and positioned closely adjacent said record, variations in magnetism of said record moving said grid in accordance with the movement of said external portion toward and away from said record, an output circuit connected to said anode and cathode, and a sound reproducer connected to said output circuit for reproducing said magnetic record.

6. A magnetic record reproducing system in accordance with claim 5, in which said record has two sections with opposite polarities transversely of said record, and a second transducer and output circuit are provided for the second section of said record, said output circuits being connected in a push-pull relationship.

DOROTHY L. O'DEA.

REFERENCES CITED

The following references are of record in the file of this patent:

UNITED STATES PATENTS

| Number | Name | Date |
|---|---|---|
| 720,621 | Rosenbaum | Feb. 17, 1903 |
| 2,265,879 | Thurm | Dec. 9, 1941 |

FOREIGN PATENTS

| Number | Country | Date |
|---|---|---|
| 351,899 | Great Britain | July 2, 1931 |